Oct. 31, 1967  F. EINRAMHOF ET AL  3,350,153
METHOD OF AND APPARATUS FOR TREATING THE ELECTRODES
OF A COLD DISCHARGE TUBE
Filed April 19, 1965

INVENTORS
FRANZ EINRAMHOF &
PIERRE TH. J. PIREE
BY

AGENT

United States Patent Office 3,350,153
Patented Oct. 31, 1967

3,350,153
METHOD OF AND APPARATUS FOR TREATING THE ELECTRODES OF A COLD DISCHARGE TUBE
Franz Einramhof and Pierre Theodoor Johan Piree, Emmasingel, Eindhoven, Netherlands, assignors to North American Philips Company, Inc., New York, N.Y., a corporation of Delaware
Filed Apr. 19, 1965, Ser. No. 449,049
Claims priority, application Netherlands, Apr. 22, 1964, 64—4,374
8 Claims. (Cl. 316—1)

The invention relates to a method of and a device for forming the electrodes of a cold discharge tube by means of rapidly recurring high voltage pulses. More particularly, the invention relates to a method of and apparatus for treating the electrodes of a cold discharge tube by means of rapidly recurring high voltage pulses to thoroughly remove any gas occlusions remaining in the tube electrodes. One example of the type of tube contemplated is the well known glow discharge tube in which, as a result of this treatment, the operating voltage of the gas discharge in the tube remains substantially constant during its life. Another example is the micro-switch in which the electrodes are closely spaced. In this case too it is important to remove by means of this treatment any gas residues remaining in the electrodes so that undesired switching actions do not occur.

It is an object of the invention to provide a simple method for effecting this treatment. It is characterized in that an alternating voltage source wtih high internal impedance is connected to the series arrangement of two capacitors of a lower impedance. The voltage developed across one of these capacitors is applied to the electrodes of the said tube through a spark gap.

In order that the invention may readily be carried into effect, it will now be described in greater detail with reference to the accompanying drawing, in which.

Figure 1:
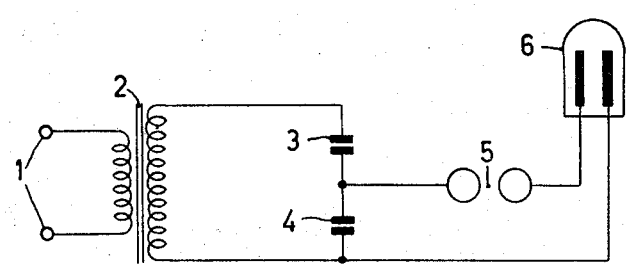
FIG. 1 shows an embodiment according to the invention.

In the embodiment shown in FIG. 1, the AC supply voltage is applied to the terminals of a transformer 2 which transforms this voltage into a high voltage of a few thousands of volts. For that purpose, the secondary of the transformer 2 comprises a great number of windings and consequently it exhibits a high internal resistance. The resulting source of high internal impedance and high voltage is connected to the series arrangement of two capacitors 3 and 4 of comparatively small value which, however, may not be too small either, for example, each 1500 pf. The voltage across one of the capacitors, namely the capacitor 4, is applied, through a spark gap 5 comprising two tungsten spheres spaced apart a few mm. distance in air, to the electrodes of the tube 6 to be formed.

Figure 2:
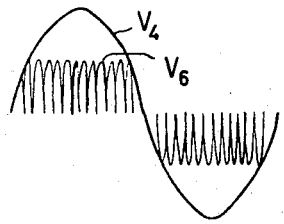
FIG. 2 is a voltage-time diagram relating to FIG. 1.

The invention is based on the following train of thought:

By the connection of the capacitors 3 and 4 to the secondary of a transformer 2 already a certain increase of the voltage across the circuit thus formed is achieved. The voltage at the junction of the capacitors 3 and 4 is designated by $V_4$ in FIG. 2. As soon as this voltage reaches the breakdown value of the spark gap 5, the energy which has collected in the capacitor 4 will discharge across the spark gap 5 and the tube 6. At the instant of breakdown the spark gap 5 has only a small resistance so that a high voltage and a high current in the order of magnitude of from 10 to 20 amp. will thus flow through the tube 6. The impedance of the capacitor 4 is for that purpose considerably smaller than the internal impedance of the secondary of the transformer 2. After every breakdown the capacitor 4 will be charged again until a breakdown of the spark gap 5 occurs again so that consequently a series of voltage pulses $V_6$ (FIG. 2) is applied to the electrodes of the tube 6. As a result of the change of polarity of the alternating voltage at the terminals 1, these voltage pulses are alternately positive and negative, so that also alternately one and then the other electrode of the tube 6 is formed. As a result gas occlusions, if any, in the electrodes of the tube 6 are released by bombardment so that it can be guaranteed that the operating voltage of the tube remains approximately constant for a long period of time.

Figure 3:
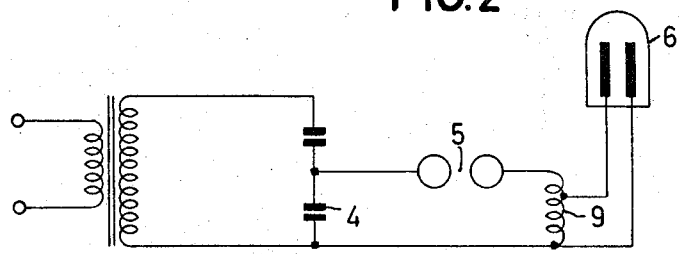
FIG. 3 is a variation of FIG. 1.

In the variation shown in FIG. 3, the voltage across the capacitor 4 is applied to a high-frequency transformer 9 through the spark gap 5. The flow tube 6 is connected to a tapping of said transformer. The transformer 9 differentiates to a certain extent the current pulses which are passed by the spark gap 5 so that a series of short-period current-wave pulses flow through the tube 6.

What is claimed is:

1. A method of forming the conductive electrodes of a cold discharge tube which comprises applying a series of high voltage unidirectional pulses of one polarity to said electrodes and thereafter applying a series of high voltage unidirectional pulses of opposite polarity to said electrodes.

2. A method of treating the conductive electrodes of a cold discharge tube to remove gas occlusions therefrom which comprises alternatley charging a first capacitor from a high voltage high impedance source of AC voltage by means of a second capacitor serially connected with said voltage source and said first capacitor and discharging said first capacitor via a circuit comprising, in series, a pair of electrodes which define a spark gap and said tube electrodes.

3. A method of treating the conductive electrodes of a cold discharge tube to remove gas occlusions therefrom which comprises applying an AC voltage to a first capacitor from a high voltage high impedance source of AC voltage of a given frequency by means of a second capacitor serially connected with said voltage source and said first capacitor, and alternately discharging said first capacitor via a circuit comprising, in series, a pair of electrodes which define a spark gap and said tube electrodes and recharging said first capacitor from said voltage source a given number of times during each half cycle of said AC voltage.

4. Apparatus for treating the electrodes of a cold discharge tube comprising, a high voltage high impedance source of AC voltage of a given frequency, first and second capacitors, means connecting said first and second capacitors in series across the output of said voltage source, a pair of electrodes arranged to define a spark gap having a given breakdown voltage, and means connecting said pair of electrodes and said tube electrodes in series circuit across said first capacitor thereby to periodically discharge said first capacitor via said series circuit so as to supply to said tube electrodes a plurality of unidirectional voltage pulses of positive and negative polarity during alternate half cycles of said AC voltage, respectively.

5. Apparatus as described in claim 4 wherein the reactive impedance values of said first and second capacitors at said given frequency and the spacing of said spark gap electrodes are chosen relative to the internal impedance of said AC source so that said first capacitor is alternately charged and discharged a plurality of times during each half cycle of said AC voltage.

6. Apparatus as described in claim 4 wherein said pair of electrodes are arranged so that the gap breakdown voltage is lower than the maximum amplitude of said AC voltage and wherein said first and second capacitors are chosen so that the charge and discharge time constants of said first capacitor are relatively short with respect to the period of said AC voltage.

7. Apparatus for treating the electrodes of a cold discharge tube to remove gas occlusions comprising, a high voltage high impedance source of AC voltage of a given frequency, first and second capacitors, means connecting said first and second capacitors in series across the output of said voltage source, a pair of electrodes arranged to define a spark gap having a given breakdown voltage, a high frequency transformer having input and output terminals, means connecting said pair of gap electrodes and said input terminals in series circuit across said first capacitor thereby to periodically discharge said capacitor a plurality of times during each half cycle of said AC voltage, and means connecting said tube electrodes to said output terminals, said transformer being arranged to at least partially differentiate the electric discharge pulses passed by said gap electrodes.

8. Apparatus as described in claim 7 wherein the values of said first and second capacitors are chosen so that said first capacitor is discharged to a voltage level below said gap breakdown voltage and recharged to a voltage level equal to or greater than said gap breakdown voltage a plurality of times during each half cycle of said AC voltage.

References Cited

UNITED STATES PATENTS 2,597,383   5/1952   Samuel _____ 316—1

RICHARD H. EANES, Jr., *Primary Examiner.*

UNITED STATES PATENT OFFICE
CERTIFICATE OF CORRECTION

Patent No. 3,350,153                              October 31, 1967

Franz Einramhof et al.

It is hereby certified that error appears in the above numbered patent requiring correction and that the said Letters Patent should read as corrected below.

In the heading to the printed specification, line 11, for "64-4,374" read -- 6404374 --.

Signed and sealed this 12th day of November 1968.

(SEAL)
Attest:

Edward M. Fletcher, Jr.
Attesting Officer

EDWARD J. BRENNER
Commissioner of Patents